United States Patent [19]

Muse, Jr et al.

[11] Patent Number: 4,658,607
[45] Date of Patent: Apr. 21, 1987

[54] OUTBOARD MOTOR LOCK

[76] Inventors: Ira F. Muse, Jr; Jerrold L. Flowers, both of Wilson, N.C.

[21] Appl. No.: 799,882

[22] Filed: Nov. 20, 1985

[51] Int. Cl.[4] .................................... F16B 41/00
[52] U.S. Cl. ........................... 70/164; 70/166; 70/232; 70/DIG. 57; 248/552
[58] Field of Search ............... 70/232, 229, 163, 164, 70/166, 57, 58, 54–56, 63, 158, 159, DIG. 57, 230, 212; 411/910, 371–373; 248/203, 552

[56] References Cited

U.S. PATENT DOCUMENTS

| | | | |
|---|---|---|---|
| 1,339,075 | 5/1920 | Toelle | 70/232 |
| 1,760,977 | 6/1930 | Duffy | 70/232 |
| 2,641,124 | 6/1953 | Gallagher et al. | 70/232 |
| 2,858,690 | 11/1958 | Sanderson et al. | 70/229 |
| 2,912,847 | 11/1959 | Putman et al. | 70/232 |
| 3,181,523 | 5/1965 | Casey . | |
| 3,505,839 | 4/1970 | Pavek | 70/230 |
| 3,605,460 | 9/1971 | Singer et al. | 70/232 |
| 3,789,635 | 2/1974 | Van Brunt | 70/232 |
| 3,808,851 | 5/1974 | Kargus et al. | 70/232 |
| 3,943,738 | 3/1976 | Foote | 70/232 |
| 4,058,994 | 11/1977 | Coppola | 70/232 |
| 4,065,946 | 1/1978 | Loynes et al. | 70/58 |
| 4,094,173 | 6/1978 | Brown | 70/237 |
| 4,228,983 | 10/1980 | Bowman, Jr. | 70/232 X |

FOREIGN PATENT DOCUMENTS

| | | |
|---|---|---|
| 338339 | 4/1920 | Fed. Rep. of Germany . |
| 1045219 | 6/1953 | France ............. 70/232 |
| 1298376 | 6/1962 | France ............. 70/232 |
| 267892 | 9/1929 | Italy . |
| 412884 | 2/1946 | Italy . |

OTHER PUBLICATIONS

Motor Accessories #472, #741224, 744842, 752536, Sherlock & Masterlock.

Primary Examiner—Gary L. Smith
Assistant Examiner—Lloyd A. Gall
Attorney, Agent, or Firm—Dowell & Dowell

[57] ABSTRACT

An outboard motor lock for boats wherein the outboard motor is secured to the boat transom by a split elongated housing which is retained in an assembled relationship by a lock disposed generally therein and which housing extends along and reinforces the transom and fully encloses the motor mounting bolts that extend from the motor through the transom thereby preventing any access to such bolts and thus preventing the unauthorized removal of the boat motor.

4 Claims, 4 Drawing Figures

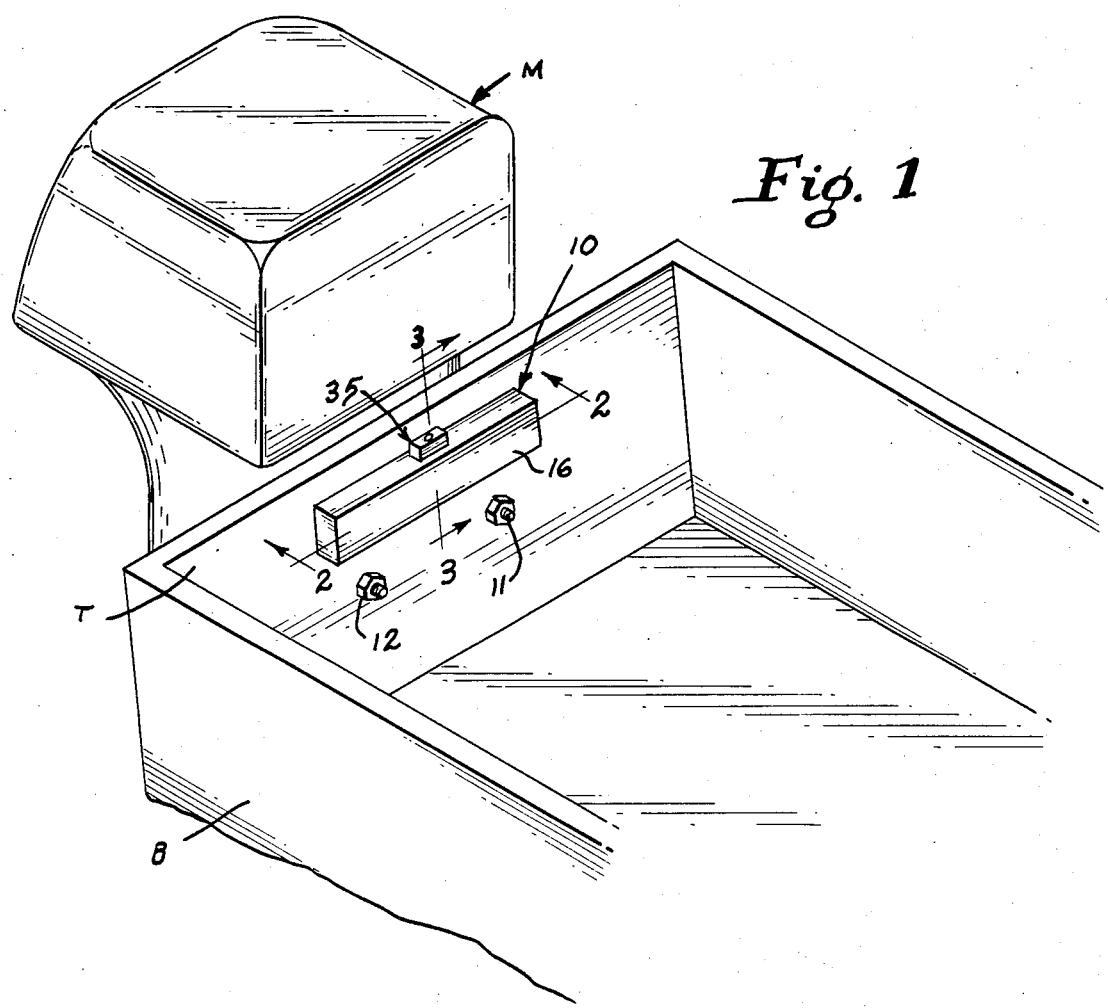
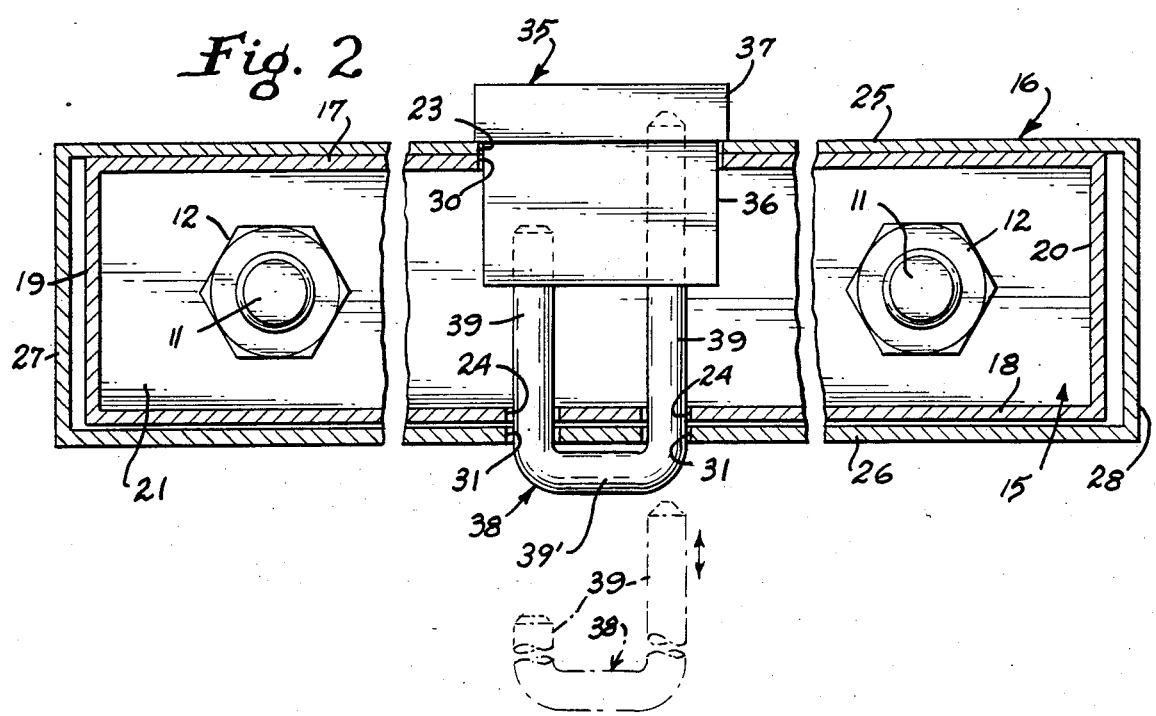

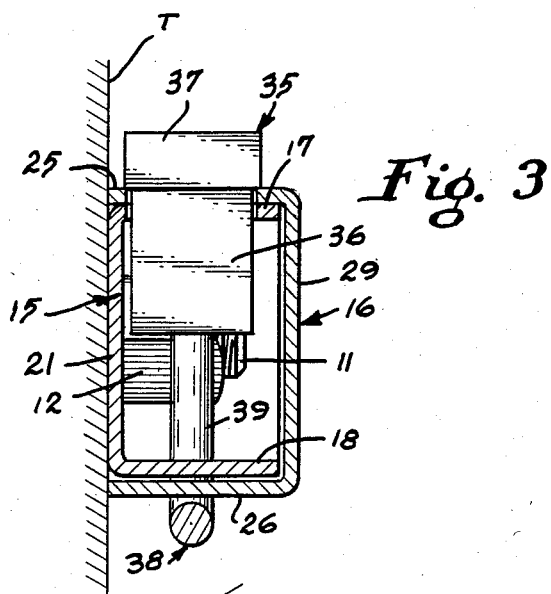
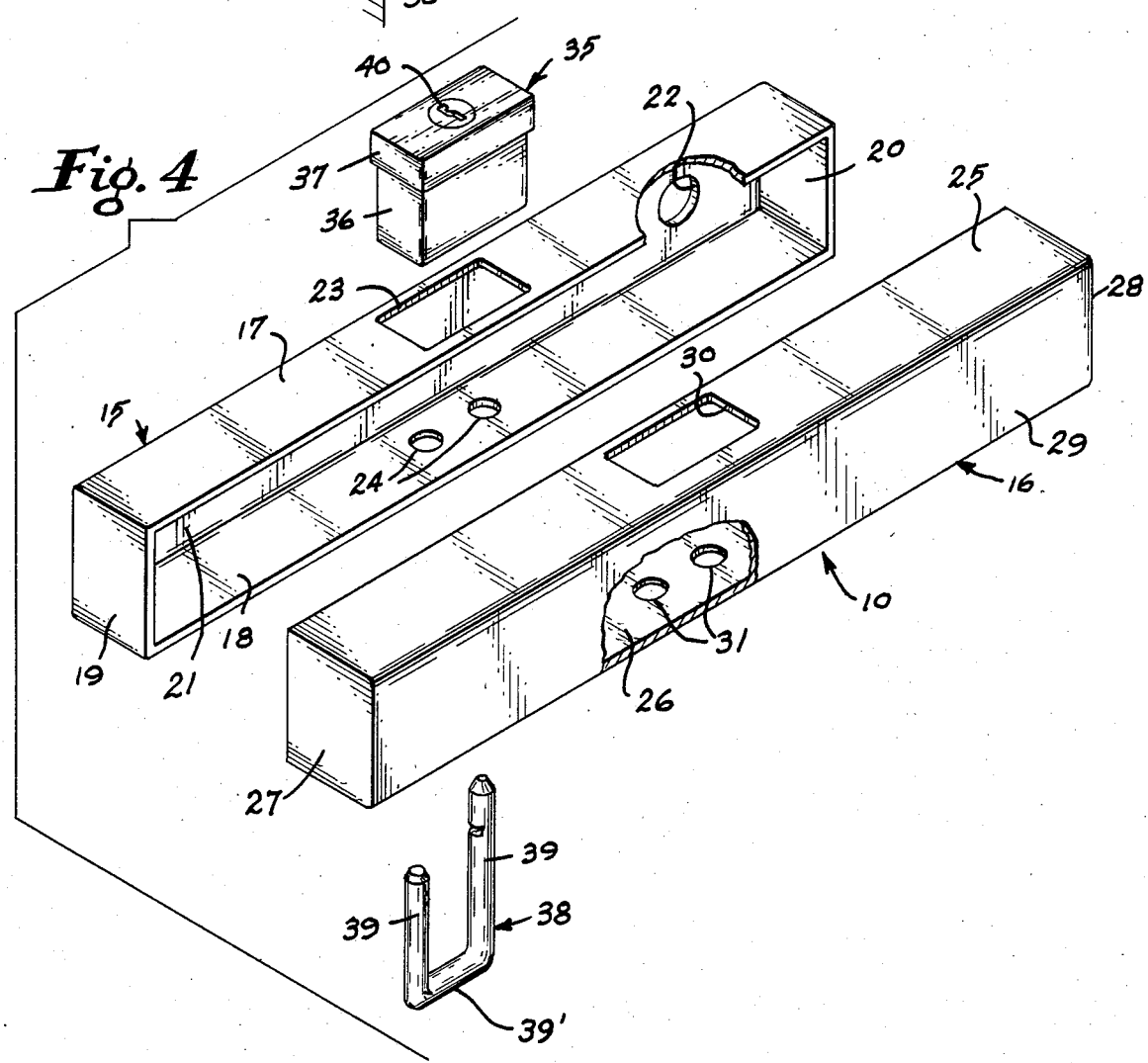

OUTBOARD MOTOR LOCK

BACKGROUND OF THE INVENTION

1. Field of the Invention

This invention is generally directed to locks for outboard motors used on motorboats and particularly to an elongated heavy duty lock mechanism which is particularly designed to totally encase and secure the mounting bolts used to mount large outboard motors to the transom of the boat while simultaneously serving to reinforce the transom.

2. History of the Invention

Heretofore there have been a number of locks designed to prevent the theft of motors used on outboard motorboats. There has been an increasing problem over the years with thefts of the outboard motors which are conventionally used on motorboats. Generally, outboard motors are mounted in one of two manners to the transom of a motorboat. With smaller outboard motors, U-shaped clamps are provided which extend from the motor or engine upwardly and over the transom and which include clamping screws which are located inside the boat which are used to secure the motor to the transom by clamping action. The manually operated clamps of such mounting devices for small engines are easily accessible, thereby making it possible for such motors to be misappropriated relatively easily.

The second type of outboard motor mounting means utilizes bolts which extend from the outboard motor through the transom. The bolts are secured on the inside of the transom by a plurality of lock nuts. Such mounting bolts are normally only used on the larger outboard motors where, due to the enormous thrust created by the operation of the outboard engine, it becomes necessary to insure that the engine cannot vibrate the mounting means and loosen the same with respect to the transom. Although the larger outboard engines are more bulky and more difficult to handle, there is also an increasing problem with the theft of such motors.

Various locking mechanisms have been designed in attempt to secure outboard motors both of the clamp-on and the bolt-on type. Some of these locking devices utilize locking means which engage the threaded shaft of a clamping member so as to prevent rotation of one or more of the clamps which are used to mount the outboard motor to the transom. Such locks may be operated utilizing either a combination or a key release mechanism. One problem inherent in the use of such locking devices is that the clamping member or shaft of the clamp is exposed and may be readily vandilized such as by cutting through the clamping member with a hacksaw thereby bypassing the locking mechanism entirely. In addition, such locks also operate on a pressured engagement between the locking mechanism and the threaded shaft of the clamp. By forcing the rotation of the clamp, it is often possible to strip the threads of the clamp member thereby permitting the clamp to be just slightly loosened thereby permitting a sliding of the clamp relative to the transom and thus, unauthorized removal of the motor accomplished with little effort.

In an effort to overcome the shortcomings of some of the prior art locking devices, efforts were directed to simultaneously locking both of the clamping members associated with outboard motor mounts. In this manner, the forceable movement of one handle would be offset or prevented by the opposing handle thereby making the locking mechanism more secure. In U.S. Pat. No. 3,943,738 to Foote, an elongated locking member is disclosed for use with outboard motors having a pair of clamping members for mounting the motor to a boat transom. In this motor lock, an elongated housing is provided with a slot along the rear portion thereof so that the housing may be urged over both the clamping members after they have been placed in aligned position with the slot permitting the shank of the clamps to extend therethrough. A padlock is thereafter provided through the upper and lower portions of the housing which forms an abuttant surface to prevent the housing from being longitudinally moved or removed from placement over the clamping members.

Another similar motor lock for preventing access to the handles of the motor mounting clamps is disclosed in U.S. Pat. No. 3,505,839 to Pavek. This lock includes a U-shaped housing which has a pair of enlarged openings therethrough through which the ends of the mounting clamps are inserted. The housing is subsequently positioned over the handles of the clamps and a separate plate locked thereto thereby enclosing the handles. Unfortunately, the handles are the only structure secured and the threaded shaft of the clamps is exposed and may be tampered with.

Unfortunately, structures such as that to Foote and Pauek are not designed to be utilized specifically with the larger or heavier outboard motors that are secured to a boat transom by the use of bolts and nuts. Although the prior art discloses a number of locking mechanisms for securing a nut relative to a bolt shaft, such structures do not offer the combined security and reinforcement capability which is necessary to adequately secure a large outboard motor to a boat transom. Most prior art bolt securing or locking devices include a housing which is mounted behind a nut threadingly received on a bolt shaft. Such locks also include a cover plate which is lockable with respect to the housing by means of a conventional padlock. When a padlock is readily exposed, the legs of the lock can be cut by the use of heavy duty cutters and the mechanism bypassed. In addition, such locking devices are generally specifically made to house only a single nut and therefore, a plurality of such locking devices would have to be utilized if more than one nut were to be secured with respect to an engine.

Some examples of prior art nut locking devices include U.S. Pat. Nos. 1,339,075 to Toelle, 1,760,977 to Duffy, 3,181,523 to Casey, 3,605,460 to Singer et al., 3,789,635 to Van Brunt et al., 4,065,946 to Loynes et al. and 4,094,173 to Brown. Other examples of motor locks include U.S. Pat. Nos. 4,058,994 to Coppola and 4,228,983 to Bowman, Jr.

SUMMARY OF THE INVENTION

This invention is directed to a motor lock which simultaneously serves as a transom reinforcement member for securing large outboard motors to motorboats wherein the lock includes an elongated housing having a first section which extends beyond two spaced motor mounting bolts and is positioned so as to be in engagement along its length with the boat transom and to which a second covering section is selectively secured. The first section includes a pair of openings through which the motor mounting bolts are extended after which the motor mounting nuts are secured thereto so as to clamp the first section of the lock housing against the boat transom. The openings are only of a sufficient size to permit the bolts to be extended therethrough. Both the first and the second sections of the lock mechanism have aligned enlarged openings therethrough through which a body of a padlock member is selectively receivable so as to be seated within the space defined between the housing sections. A pair of opposing generally small aligned openings are also provided so as to be in substantial alignment with the first enlarged openings through the housing through which a U-shaped locking bar of the padlock may be selectively extended into mating relationship with the body of the padlock opening so that substantially all of the locking bar is situated within the area defined between the housing sections. The housing sections are fully closed on both the upper and lower and end surfaces so as to completely surround or encase the outboard motor locking nuts which are mounted to the bolts extending through the transom of the boat and to substantially enclose the padlock locking members so that any tampering with the nuts, bolts or with the padlock locking member is substantially prevented; while at the same time, the elongated housing provides a reinforcement for distributing forces along an extended area of the transom.

It is a primary object of the present invention to provide a locking mechanism for use in securing the mounting bolts and nuts utilized to mount a relatively large outboard motor to the transom of a motorboat in such a manner that the nuts are completely encased so as to prevent any unauthorized access thereto and the bolts are not exposed inside the transom thereby preventing any tampering therewith.

It is also an object of the present invention to provide a heavy duty locking mechanism which extends between at least two bolts which are used to mount an outboard motor to the transom of a boat and which locking mechanism is provided with a housing which engages an elongated section of the transom and is secured against the transom by the nuts which lock the bolts mounting the outboard motor to the transom in such a manner that forces are distributed from the bolts to the housing and thereby distributed over an extended area of the boat transom.

It is further object of the present invention to provide a protection housing for outboard motorboats mounting nuts and bolts wherein the nuts which are used to secure the mounting bolts are completely housed or encased within the protective housing and which housing is locked by a padlock mechanism which is substantially contained within the housing to prevent any unauthorized access to portions thereof.

It is also an object of the present invention to provide a lock mechanism for securing at least two mounting bolt and nut assemblies utilized to attach or secure an outboard motor to the transom of a motorboat wherein the housing cannot be forced or moved relatively to the boat transom and which is clampingly secured to the transom by the nuts which secure the motor to the transom.

BRIEF DESCRIPTION OF THE DRAWINGS

FIG. 1 is a perspective illustrational view of the outboard motor locking mechanism of the present invention as it is used to secure a pair of locking nuts which are threaded to the mounting bolts which extend from a large outboard motor through the transom of a boat.

FIG. 2 is an enlarged cross sectional view having portions broken away taken along lines 2—2 of FIG. 1 and showing the locking mechanism with the padlock securing member in both locked and unlocked positions.

FIG. 3 is an enlarged cross sectional view taken along lines 3—3 of FIG. 1.

FIG. 4 is an exploded assembly view of the locking mechanism of the present invention showing the mating housing portions and the padlock locking members.

DESCRIPTION OF THE PREFERRED EMBODIMENT

The outboard motor locking apparatus 10 of the present invention is shown in FIG. 1 as it is used to secure a large outboard motor M to the transom T of an outboard motorboat B. As previously discussed, the outboard motor locking apparatus 10 is particularly designed for use in securing motors to boats where the motor is attached by a plurality of mounting bolts 11 which extend through the transom T of the boat B and are secured thereto by locking nuts 12. The purpose of the outboard motor locking apparatus is to provide a complete enclosure which will surround at least two of the mounting bolts and locking nuts which secure the motor to the transom and prevent any unauthorized access thereto while simultaneously providing means for distributing the stress imparted to the mounting bolts and locking nuts across an enlarged area of the transom.

The outboard motor locking apparatus 10 includes a pair of opposing housing sections 15 and 16 wherein one of the housing sections is receivable within the opposing housing section. In the drawings, housing section 15 is shown as being somewhat smaller in length, width and depth dimensions thereby permitting it to be slidingly received within housing section 16 or covered by housing section 16 as shown in FIG. 3. It would be possible, however, to make the housing section 15 slightly larger than housing section 16 thereby making housing section 16 receivable therein.

Housing section 15 includes upper and lower walls 17 and 18 which are joined at their ends by end walls 19 and 20 and which also includes a rear wall 21 which extends continuously between the side walls and upper and lower walls thereof. A pair of spaced openings 22 are provided through the rear wall 21 of housing section 15 with the diameter of the openings 22 being substantially equal to the diameter of the outboard motor mounting bolts which extends through the transom T of the motorboat B. The openings 22 are spaced so as to be aligned with a pair of horizontally spaced mounting bolts 11 which extend through the transom of the boat. When housing section 15 is in use, it is placed with the rear wall thereof in abutting relationship with the transom with the openings 22 aligned to permit the motor mounting bolts 11 to be extended therethrough. Thereafter, the motor lock nuts 12 are secured to the locking bolts 11 thereby anchoring the housing section 15 in clamped relationship against the transom T as the nuts are rotated to secure the motor to the boat. It is important that the openings 22 be the proper size and not too large so that any lateral movement of section 15 is prevented by the abutment of the rear wall with the mounting bolts.

Housing section 15 further includes a generally rectangular opening 23 which is provided through the upper wall 17 thereof and a pair of smaller and spaced lower openings 24 which are provided through the lower wall 18 thereof. Although openings 23 and 24 are shown as being placed generally centrally with respect to the housing section 15, it should be noted that they may be provided along various portions of the housing so long as they do not interfere with the openings 22 and further provided that opening 23 is in opposing relationship with openings 24.

Housing section 16 is shown as being constructed in generally the same manner as housing section 15 and includes an upper wall 25 and lower wall 26 which are connected at their ends by side walls 27 and 28 and further having a continuous rear wall 29. Unlike housing section 15, there are no openings provided through the rear wall 29 of housing section 16. As previously mentioned, housing section 16 is of a size to fit over or enclose housing section 15. The section also includes an opening 30 through the upper surface thereof which is formed in an area to be in aligned relationship with opening 23 in housing section 15 when housing section 16 is placed in overlying relationship with respect to housing section 15. In a like manner, a pair of lower spaced openings 31 are provided through the lower surface 26 of housing section 16 so as to be in substantial alignment with the openings 24 provided through the lower wall of housing section 15 when the sections are in engagement with one another.

In order to secure housing sections 15 and 16 in a locked relationship with respect to one another, a padlock 35 is provided having a body portion 36 which is insertable through the openings 23 and 30 in the housing sections 15 and 16. In order to limit the placement of the body portion 36 of the padlock within the housing sections, the upper portion thereof is enlarged as at 37 so as to be supported in abutting relationship with the upper surface 25 of housing section 16. The padlock 35 further includes a generally U-shaped locking bar 38 having a pair of generally parallel leg portions 39 which are integrally connected at one end by an intermediate portion 39'. The leg portions 39 are insertable through the aligned openings 31 and 24 in the housing sections 16 and 15, respectively, so as to be receivable in openings provided in the lower portion of the body 36 of the padlock. The locking bar 38 is releasably removed from the body portion 36 of the padlock by operation of a key cylinder 40 which is provided in the upper portion of the padlock mechanism.

As shown in FIG. 3, when housing sections are disposed in overlapping relationship and the padlock mechanism installed therein, the locking bolt 38 will extend generally flush with the lower surface 26 of housing section 16 so as to effectively prevent the use of any type of cutting plyers or sheers to be used to sever the locking bar exteriorly of the housing members. With the padlock in place, housing section 15 is united with housing section 16 thereby completely enclosing or encasing the lock nuts 12 and the mounting bolts 11 with respect to the transom T of the motorboat.

As previously discussed, the housing sections are elongated and the rear wall 21 of housing section 15 is generally flat so as to be flush with the surface of the transom T when in mounted position. In this manner, any stresses imparted through the mounting bolts 11 and locking nuts 12 from the outboard motor will be distributed by the rear surface of housing section 15 to an enlarged area of the transom thereby making the attachment of the motor more secure.

The outboard motor locking apparatus is preferably constructed of a heavy gauge steel plate which may be galvinized or otherwise treated to prevent any rusting which may be caused by exposure of the locking mechanism to water or salt. In order to insure that the locking apparatus cannot be tampered with using heavy tools, the steel plate is preferably made from heavy stock material which may be ⅛ inch or larger in thickness. Also, as shown in cross section FIG. 3, the upper and lower walls of each of the sections 15 and 16 are preferrably integrally formed with the rear walls thereof with the end walls being welded thereto. Because each section 15 and 16 of the locking apparatus includes upper and lower and side wall portions, when one section is nested within the other, there is no direct opening into the area within the housing and thereby any access or attempt to pry one section away from the other is effectively defeated. In some embodiments of the invention and although not shown in the drawings, it may be possible to exclude the end walls 19 and 20 of section 15 which is covered by the outer section 16 as the ends will still be covered by the end walls 27 and 28 of section 16 when the sections are nested within one another.

In the use of the outboard motorboat locking device of the present invention, as the outboard motor is being initially mounted to the transom of the boat, the bolts 11 are extended through openings in the transom. Housing section 15 of the locking apparatus is thereafter aligned over the bolts 11 with such bolts extending through the openings 22 in the rear wall 21. Thereafter, the motor lock nuts 12 are threaded onto the bolts 11 and drawn into tight engagement therewith thereby securing the motor to the transom and simultaneously securing housing section 15 of the locking apparatus to the transom. Thereafter, housing section 16 is placed over housing section 15 so that the openings 23 and 30 are in substantial alignment and openings 31 and 24 are in substantial alignment. The padlock apparatus is thereafter inserted so that the body portion 36 extends inwardly of the housing and the locking bar 38 is thereafter inserted upwardly through the openings 31 and 24 into locking engagement with the body 36 of the padlock. The locking nuts 12 and that portion of the mounting bolts 11 which extends through the transom are now completely encased within the steel plate housing sections and access thereto cannot be obtained without defeating the padlock locking device which joins the sections in a locked relationship.

We claim:

1. A locking apparatus for use in securing an outboard motor to the transom of a motorboat wherein the motor mount includes at least two spaced bolts which extend through the transom of the boat and which are normally secured to the transom by lock nuts threadingly engaged about the bolts wherein the locking apparatus comprises said at least two spaced bolts, a first elongated housing section having a generally U-shaped cross section and which includes a rear wall for engaging the transom of the boat and spaced upper and lower walls which extend outwardly therefrom, said rear wall of said first housing section being generally planar so that said rear wall is in continuous abutting contact with the boat transom along its length to thereby reinforce the transom, said first housing section having a pair of spaced holes through said rear wall thereof so as to be in substantial alignment with the bolts extending through the transom of the boat and further having a first enlarged opening through the upper wall thereof in spaced offset relationship with respect to said spaced holes through the rear wall thereof, said pair of spaced holes in said rear wall having a diameter substantially equal to the diameter of the bolts which extend through the transom, a first pair of spaced openings through the lower wall of said first housing section, said first pair of spaced openings in said lower wall being in opposing alignment with said first enlarged opening through said upper wall thereof, a second elongated housing section having a generally U-shaped cross section and having an outer wall disposed in opposing relationship with the rear wall of said first housing section and having upper and lower walls extending outwardly therefrom toward said rear wall of said first housing section, a second enlarged opening through said upper wall of said second housing section and a second pair of spaced openings through the lower wall thereof which are in opposing alignment with said second enlarged opening, said first and second enlarged openings and said first and second pairs of spaced openings being in general alignment with one another when said second housing section is brought into nested relationship with said first housing section, at least one of said first and second housing sections including a pair of opposing end walls which extend between said upper and lower walls and between said rear wall of said first housing section and said outer wall of said second housing section, padlock means having a body portion insertable through said aligned first and second enlarged openings so as to be substantially disposed between said first and second housing sections, padlock bolt means selectively extended through said first and second aligned pairs of spaced openings in said lower walls of said first and second housing sections and engageable with said padlock means whereby the mounting bolts extending through the transom and the lock nuts are enclosed within said first and second sections.

2. The locking apparatus of claim 1 in which said padlock bolt means includes first and second generally parallel leg portions which are integrally connected at one end by an intermediate portion, said intermediate portion abutting said lower wall of one of said first and second housing sections when said leg portions are locked to said body portion of said padlock means.

3. The locking apparatus of claim 2 in which each of said first and second housing sections include opposing closed end wall portions.

4. The locking apparatus of claim 3 in which said second housing section is of a size to slidingly receive said first housing section therein as said sections are placed in nested relationship with respect to one another.

* * * * *